United States Patent [19]

Moore

[11] Patent Number: 5,522,672
[45] Date of Patent: Jun. 4, 1996

[54] SYSTEM AND METHOD FOR CLEANING A SEWAGE FIELD LINE FROM A SEPTIC TANK

[76] Inventor: Thomas R. Moore, 1540 Old Columbia Rd., Dickson, Tenn. 37055

[21] Appl. No.: 262,592

[22] Filed: Jun. 20, 1994

[51] Int. Cl.⁶ .............................. E02B 11/00; B08B 3/04
[52] U.S. Cl. .................. 405/41; 405/36; 210/170; 210/532.2
[58] Field of Search ........................ 405/36, 43, 45, 405/41, 40, 39; 210/170, 532.2

[56] References Cited

U.S. PATENT DOCUMENTS

| | | | |
|---|---|---|---|
| 848,279 | 3/1907 | Ashley | 210/170 X |
| 956,665 | 5/1910 | Ashley | 210/170 X |
| 1,281,427 | 10/1918 | Steelquist | 405/41 |
| 2,309,233 | 1/1943 | Black | 405/41 X |
| 2,991,625 | 7/1961 | Anderson et al. | 405/40 X |
| 3,159,172 | 12/1964 | Baxter | 405/41 X |
| 3,589,393 | 6/1971 | Dieterich | 137/572 |
| 3,954,612 | 5/1976 | Wickerson | 405/43 |
| 4,207,647 | 6/1980 | Masters | 15/302 |
| 4,234,980 | 11/1980 | DiVito | 15/302 |
| 4,252,462 | 2/1981 | Klingle et al. | 210/170 X |
| 4,317,539 | 3/1982 | Pollock | 405/41 X |
| 4,443,908 | 4/1984 | Wiederman | 15/302 |
| 4,525,277 | 6/1985 | Poulin | 210/601 |
| 4,824,572 | 4/1989 | Scott | 210/170 X |
| 4,935,984 | 6/1990 | Bryant et al. | 15/302 |
| 5,068,940 | 12/1991 | Sheppard et al. | 15/104 |
| 5,129,957 | 7/1992 | Sheppard et al. | 134/22 |
| 5,133,622 | 7/1992 | Hewlett | 405/43 X |
| 5,200,065 | 4/1993 | Sinclair et al. | 210/532.2 X |
| 5,360,556 | 11/1994 | Ball et al. | 405/90 X |
| 5,365,970 | 11/1994 | Butler | 405/39 X |

*Primary Examiner*—Michael Powell Buiz
*Assistant Examiner*—Frederick Lagman
*Attorney, Agent, or Firm*—Waddey & Patterson; Edward D. Lanquist, Jr.

[57] ABSTRACT

The present invention discloses a system and method for cleaning the field lines of a septic tank system. The field lines are outflow pipe fluidly connected to the septic tank. To the field line, there is connected a first pipe and a second pipe or a flush pipe and a vacuum pipe. One of the pipes directs cleaning fluid, usually water, into the field line while the other removes the cleaning fluid and other material from the field line through the field line. A third or valve pipe is added between the first and second pipes and the septic tank. A valve can be placed into the third or valve pipe which is used to close the flow of fluid between the septic tank and the first and second pipes.

6 Claims, 3 Drawing Sheets

5,522,672

1

SYSTEM AND METHOD FOR CLEANING A SEWAGE FIELD LINE FROM A SEPTIC TANK

BACKGROUND OF THE INVENTION

The present invention relates generally to a sewage system and more particularly to a system and method for improved cleaning of a field sewage line of a septic tank.

It will be appreciated by those skilled in the art that in rural areas outside the reach of municipal and urban sewage systems, individuals are forced to use septic tanks. These septic tanks act to store sewage as well as to house biological and other media which break down the stored material. As liquids build up in septic tanks, these liquids and the material suspended in the septic tank are directed out a sewage field line which usually runs hundreds of feet. These sewage field lines have holes placed in them to allow liquids to leak into the ground around the lines. Unfortunately, over time, the sewage lines need to be cleaned because the suspended material settles in the pipes and builds up. Usually these materials turn into a grease-like substance that breaks down the properties of the lines. However, total flushing of the septic tank systems has not worked because to flush the lines also requires flushing the tank.

The standard field line from a septic tank has no ground access. Therefore, in order to clean the sewage field lines, the ground must be excavated and the lines pulled and either cleaned or replaced. This is a cost and labor intensive project. Some pipes are provided with a single pipe accessible from the ground which enables a mechanical snake to clean the field line but does not allow the fluid flushing that best works because flushing the line will also flush the tank.

What is needed, then, is a system and method that allows the field line to be cleaned. The needed system must be capable of being added to an existing field line without removing the existing field line. The needed system and method must allow the field line to be cleaned without excavation. This needed system and method must be capable of cleaning the sewage lines without removing material within the septic tank. This needed system and method is presently lacking in the prior art.

SUMMARY OF THE INVENTION

The present invention discloses a system and method for cleaning the field lines of a septic tank system. The field lines are outflow pipe fluidly connected to the septic tank. To the field line, there is connected a first pipe and a second pipe or a flush pipe and a vacuum pipe. One of the pipes directs cleaning fluid, usually water, into the field line while the other removes the cleaning fluid and other material from the field line through the field line. A third or valve pipe is added between the first and second pipes and the septic tank. A valve can be placed into the third or valve pipe which is used to close the flow of fluid between the septic tank and the first and second pipes.

Accordingly, one object of the present invention is to provide a system which can be added to an existing field line to improve cleaning.

An additional object of the present invention is to provide a system and method which can clean the field line without excavation.

Another object of the present invention is to provide a system and method for cleaning a field line of a septic tank which prevents the flow in and out of the septic tank.

2

Still another object of the present invention is to provide a valve which can limit the cleaning to the portion of the field between the first and second pipes.

DESCRIPTION OF THE PREFERRED EMBODIMENT

Figure 1:
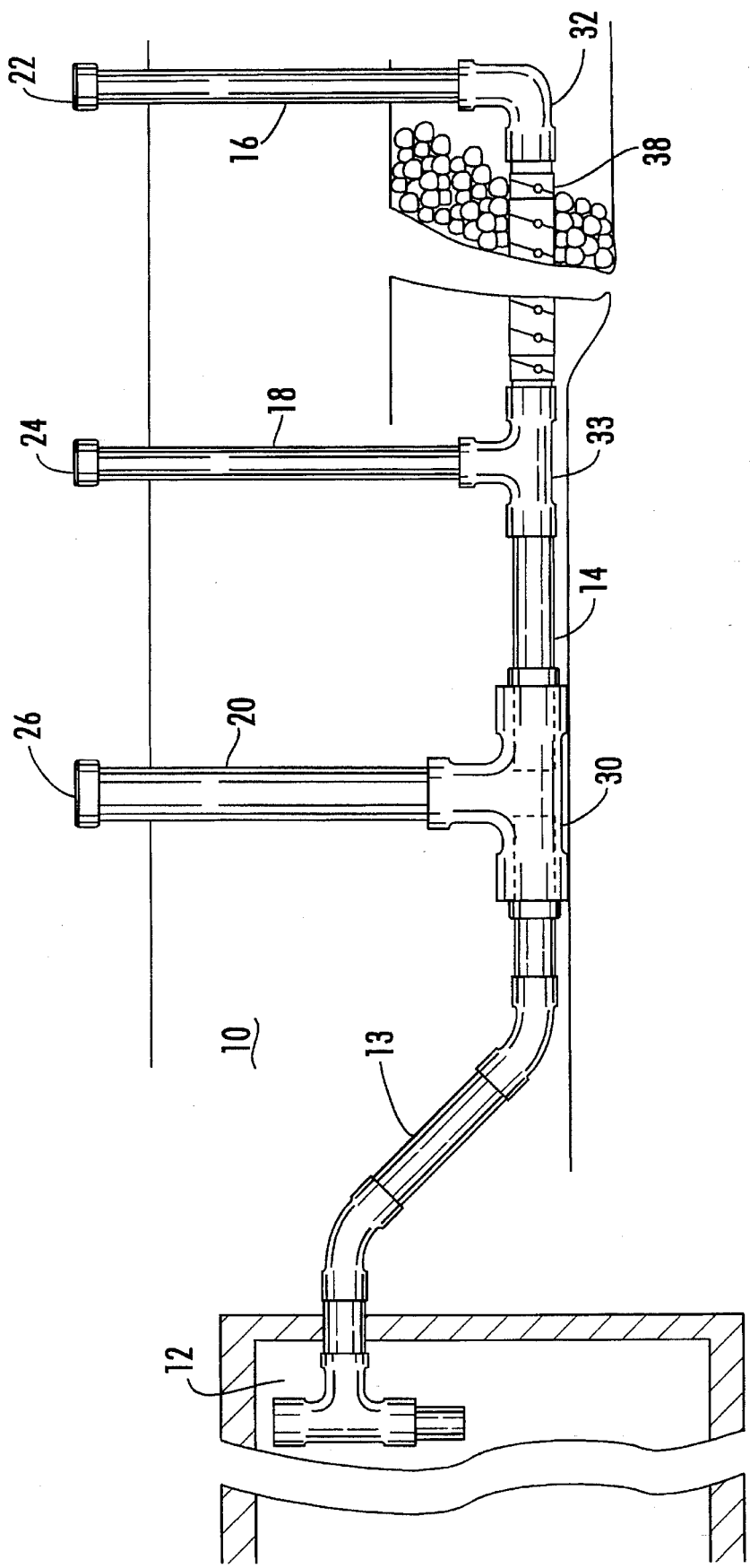
FIG. 1 is a frontal view of the "System and Method for Cleaning a Sewage Field Line from a Septic Tank" of the present invention.

Referring now to FIG. 1 there is shown generally at 10 the "System and Method for Cleaning a Sewage Field Line from a Septic Tank" of the present invention. System 10 is made of septic tank 12 which is fluidly connected to field line 14 by tight line 13. In many cases, an existing septic tank 12 and field line 14 can be used. For purposes of reference, the terminology first pipe or flush pipe 16 and second pipe or vacuum pipe 18 will be used. However, the location of neither is critical as long as third or valve pipe 20 is placed between pipes 16, 18 and septic tank 12. In other words, third or valve pipe 20 must be placed between septic tank 12 and pipe 18 as well as septic tank 12 and pipe 16. In this particular embodiment, first or flush pipe 16 is connected proximate to end of field line 14 by elbow 32. Second pipe or vacuum pipe 18 is also fluidly connected to field line 14. Third pipe 20 is fluidly connected to field line 14 by cut-off 30. In the preferred embodiment, cut-off 30 is a T-valve the size of which will be discussed later. Further, in many existing septic tank systems, first and second pipes 16 and 18 are fluidly connected to field line 14. Therefore, in order to convert an existing system into the septic tank system 10 of the present invention, a portion of field line 14 is removed and replaced with cut-off 30 fluidly connected to third pipe or valve pipe 20. Further, first pipe 16 is joined to field line 14 in the preferred embodiment proximate to portion 38 by elbow 32. Second pipe 18 is joined to field line 14 in the preferred embodiment by second T-joint 33. When system 10 is not being cleaned, caps 22, 24, and 26 are attached to an open end of pipe 16, 18, and 20, respectively.

Figure 2:
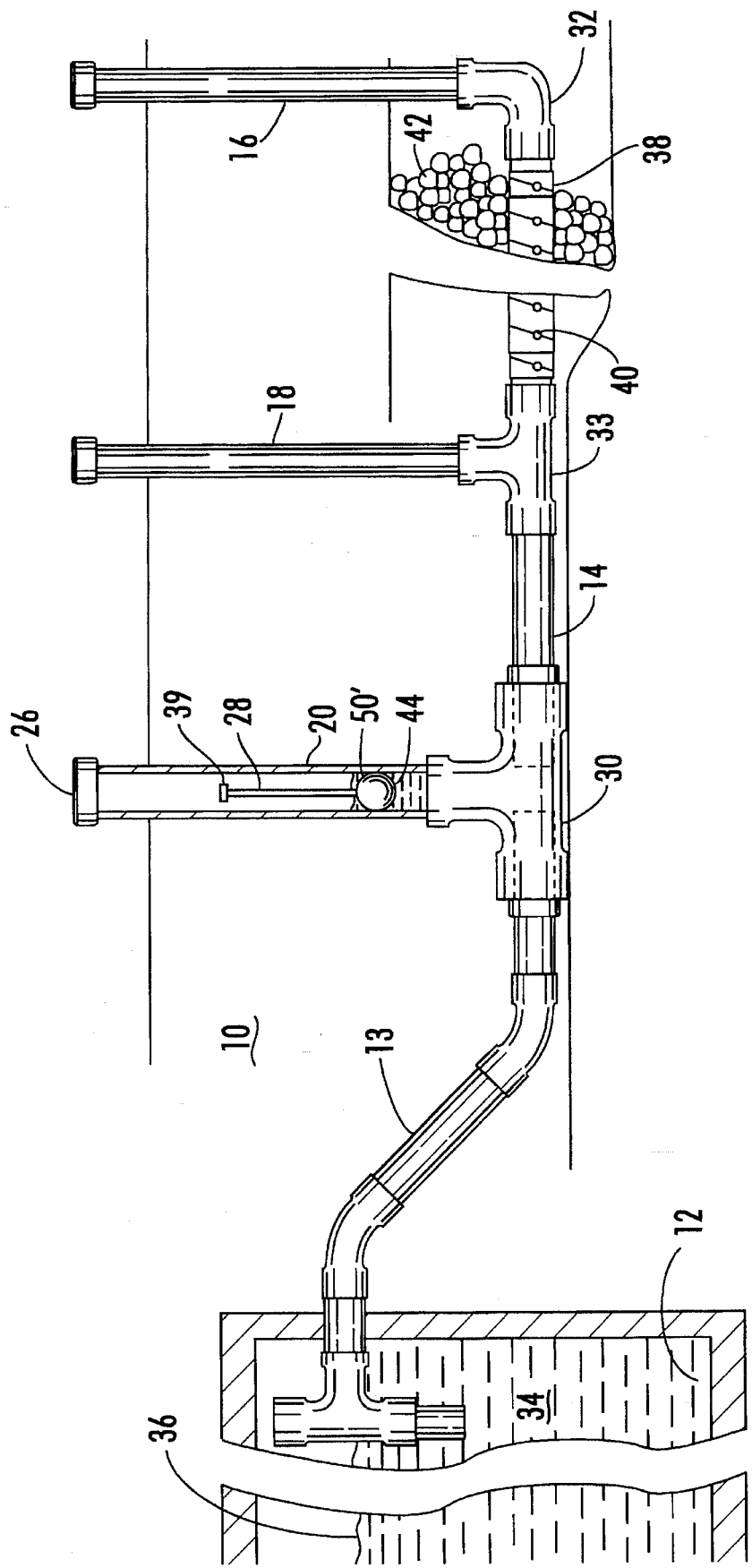
FIG. 2 is a frontal view of the "System and Method for Cleaning a Sewage Field Line from a Septic Tank" of the present invention.

Referring now to FIG. 2 there is shown generally at 10 the system of the present invention in a opened position. Fluid 34 in septic tank system 10 is at level denoted by 36. Into third pipe 20 is placed valve 28 which floats proximate to fluid level 36. In order to prevent back-flow of fluid 34 in septic tank 12, field line 14 is usually provided with a portion 38 between pipe 16 and 18 which has holes 40 which allow fluid 34 to seep into some type of filtering media 42 such as stone, pebbles, rocks, and the like. In FIG. 2, valve 28 is in an opened position because head 44 does not intersect field line 14.

Figure 3:
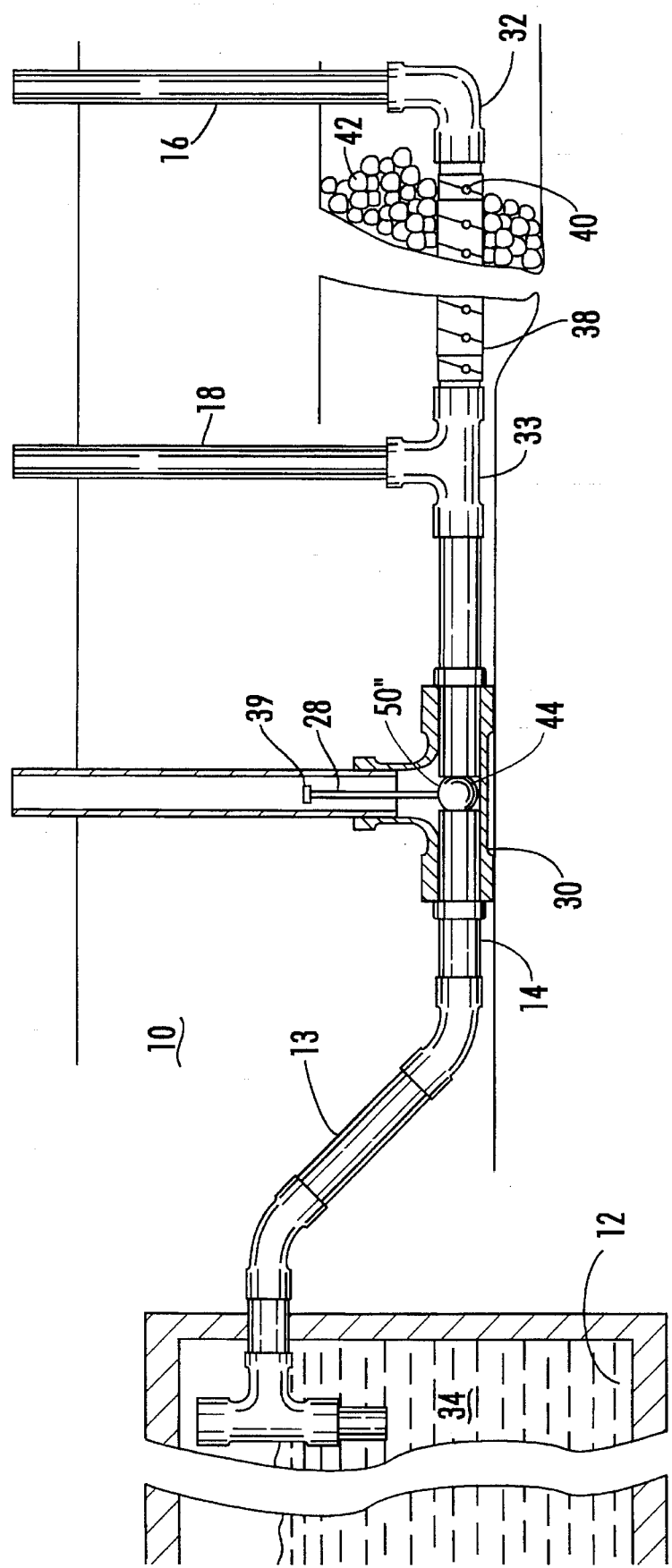
FIG. 3 is a frontal view of the "System and Method for Cleaning a Sewage Field Line from a Septic Tank" of the present invention.

Referring now to FIG. 3 there is shown generally at 10 septic tank system in closed position 50". In this particular embodiment, valve 28 is pulled into place such that head 44 is inside cut-off 30 so that the flow of fluid 34 through field line 14 is interrupted. This can be done by applying a vacuum force into first or second pipes 16, 18. Cleaning fluid is flushed through first or flush pipe 16 and vacuumed from second or vacuum pipe 18. In the preferred embodiment, cap (22 in FIG. 1) can be placed on first pipe 16 so that when materials vacuumed from second pipe 18, the suction also draws liquid residing within filter media 42 through hole 40 in portion 42. Similarly, in order to cleanse filter material 42, cap (24 in FIG. 1) can be placed on second pipe 18 so that when fluid is flushed into first pipe 16, the fluid will be transmitted out of holes 40 in portion 38 through holes 40 into media 42. Thus, neither the flushing nor the suction change the fluid level in septic tank 12.

Although in FIGS. 2 and 3, valve 28 is shown to be elongated with a round head 44, valve 28 can be in any configuration as long as it capable of cutting up measuring fluid level 36 in an open position and cutting off flow through field line 14 in a closed position.

Referring now to FIGS. 1–3, if a clog develops between third pipe 20 and septic tank 12, caps 22 and 26 can be placed over first and third pipes 22, 26 and vacuum can be attached to second pipe 18 after valve 28 is removed. This allows force to be directed at the clog.

Thus, although there have been described particular embodiments of the present invention of a new and useful system and method for cleaning a sewage field line from a septic tank, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A septic tank system comprising:
   a. a septic tank;
   b. a field line fluidly connected to said septic tank;
   c. a first pipe fluidly connected to said field line;
   d. a second pipe fluidly connected to said field line;
   e. a third pipe fluidly connected to said field line by a cut-off between said septic tank and said first and second pipes;
   f. a valve received by said third pipe having an open and a closed position such that in an open position said valve floats proximate a water level in said system and that in said closed position said valve is received by said cut-off to prevent flow between said septic tank and said first and second pipes; and
   g. means located on top of either said first pipe or said second pipe for stopping flow of air into either of said first pipe or said second pipe to create a vacuum in said field line.

2. The septic tank system of claim 1 wherein said valve is removable from said third pipe.

3. The septic tank system of claim 1 wherein said cut-off is a T-joint receivable of said valve.

4. A system for cleaning a field line of a septic tank comprising:
   a. a flush pipe fluidly connected to said field line, said flush pipe being closed;
   b. a vacuum pipe fluidly connected to said field line;
   c. a valve pipe fluidly connected to said field line by a cut-off between said septic tank and said flush and vacuum pipes; and
   d. a valve received by said valve pipe wherein said valve having an open and a closed position such that in an open position said valve floats proximate said water level in said system and that in said closed position said valve is received by said cut-off to create a vacuum in said field line.

5. The system of claim 4 wherein said valve is removable from said valve pipe.

6. The system of claim 4 wherein said cut-off is a T-joint receivable of said valve.

* * * * *